United States Patent [19]

Friesen

[11] Patent Number: 4,585,267
[45] Date of Patent: Apr. 29, 1986

[54] TOP COVER PANEL FOR A CONTAINER

[76] Inventor: David W. Friesen, Box 6, R.R. #3, Winkler, Manitoba, Canada, R0G 2X0

[21] Appl. No.: 598,587

[22] Filed: Apr. 10, 1984

[30] Foreign Application Priority Data

Apr. 15, 1983 [GB] United Kingdom ............... 8310270

[51] Int. Cl.⁴ .............................................. B60J 7/10
[52] U.S. Cl. ................................ 296/100; 105/377; 296/1 S
[58] Field of Search ............... 296/100, 101, 216, 1 S; 52/64, 66; 105/377

[56] References Cited

U.S. PATENT DOCUMENTS

| 1,934,929 | 11/1933 | Johnson | 296/100 |
| 2,979,361 | 4/1961 | Eppinger | 296/100 |
| 3,008,759 | 11/1961 | Stiefel et al. | 296/100 |
| 3,019,743 | 2/1962 | Stiefel et al. | 105/377 |
| 3,628,828 | 12/1971 | Page | 296/100 |
| 3,861,737 | 1/1975 | Kirkbride | 296/100 |
| 4,368,674 | 1/1983 | Wiens et al. | 105/377 |

FOREIGN PATENT DOCUMENTS 2634714 2/1978 Fed. Rep. of Germany .
616891 12/1978 Switzerland .

Primary Examiner—Robert R. Song
Attorney, Agent, or Firm—Stanley G. Ade; Adrian D. Battison

[57] ABSTRACT

A cover arrangement for a truck box is provided by a pair of rigid cover panels which extend along the length of the truck box and meet at the center line. The cover panels are pivotally movable from the closed abutting position to an open position alongside side walls of the truck box on upper and lower levers with the upper levers interconnected by a torque tube rotatably mounted on the panel. The panel is formed by a framework having transverse struts and longitudinal weight support tubes. The upper levers, one arranged at each end of the panel, are spring biased and latched into the closed position. A gable end structure which is inclined inwardly provides a flange for supporting the ends of the cover panel in a manner which provides a seal and reduces air pressure.

19 Claims, 5 Drawing Figures

TOP COVER PANEL FOR A CONTAINER

BACKGROUND OF THE INVENTION

This invention relates to a top cover panel for a container.

In view of legal restrictions on exposing loads in a truck box to the atmosphere during transportation, and in view of the desirability of protecting such loads from the weather, much attention has been given over many years to devices for covering an open top of the truck box generally using a tarpaulin or tarp which rolls from one side of the truck to the other side at which it is latched.

Such flexible tarps and the latching and support arrangements have been developed to a situation where they are generally satisfactory. However, there remains a number of disadvantages based upon the fact that the cover is in fact flexible.

SUMMARY OF THE INVENTION

It is one object of the present invention, therefore, to provide an arrangement whereby a cover for such a truck box can be formed from a rigid sheet and at the same time can be pivoted from a closed position in which it lies over the open top to an open position in which it lies alongside one side of the truck box.

According to a first aspect of the invention, therefore, there is provided a cover arrangement for a container having a vertical side panel and an open top, the cover arrangement comprising a substantially rigid cover panel, means for mounting the cover panel on the container for pivotal movement from a first position in which the cover panel lies over the open top to a second position in which the cover panel hangs downwardly alongside and parallel to the vertical side panel, said mounting means including a pair of pivotal members attached to the cover panel at positions spaced longitudinally thereof for rotational movement relative thereto and an elongate torque transmission member interconnecting said pivotal members for co-rotation relative to said cover panel.

According to a second aspect of the invention there is provided a cover arrangement for a container having a vertical side panel and an open top, the cover arrangement comprising a substantially rigid cover panel, means for mounting the cover panel on the container for pivotal movement from a first position in which the cover panel lies over the open top to a second position in which the cover panel hangs downwardly alongside and parallel to the vertical side panel, said cover panel having a length greater than the width thereof and comprising a flat sheet and a framework supporting the flat sheet, the framework including a plurality of transversely extending support struts, at least one strut being rigidly connected to the next adjacent strut by at least one longitudinally extending torque resistant tube.

According to a third aspect of the invention there is provided a cover arrangement for a container having two spaced parallel vertical side panels and an open top, the cover arrangement comprising a pair of substantially rigid cover panels, and means for mounting each of the cover panels on the container for pivotal movement from a first position in which the cover panels lie side by side with one edge in abutting relationship with the other panel over the open top with an opposed edge at a top edge of a respective side panel to a second position in which each cover panel hangs downwardly alongside and parallel to the respective vertical side panel, said mounting means comprising for each cover panel two longitudinally spaced pairs of levers, each pair having an upper lever with one end pivotally connected adjacent said one edge of the panel and the other end for pivotal connection to said container between said respective side panel and a centre line of the container and a lower lever with one end pivotally connected adjacent said opposed edge of the cover panel and the other end for pivotal connection to said container on an outer surface of said respective side panel.

The invention, therefore, helps to provide firstly a substantially rigid cover panel which is resistant to sagging particularly at a centre line of the container which can lie along one side of the cover panel. In such an arrangement, two such cover panels are provided which meet edge to edge at the centre line.

The invention can also provide an improved method of pivoting the rigid cover panels from the closed position to the open position wherein the pivotal movement occurs or is provided by the pivot members with the pivot members interconnected by the torque transmission member, preferably in the form of a tube. In this way, the pivotal members act together to move into the open position and avoid twisting forces or torque on the cover panel which can cause it to wedge or jam.

Preferably, the pivotal members about which the cover panel is moved are provided by levers.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
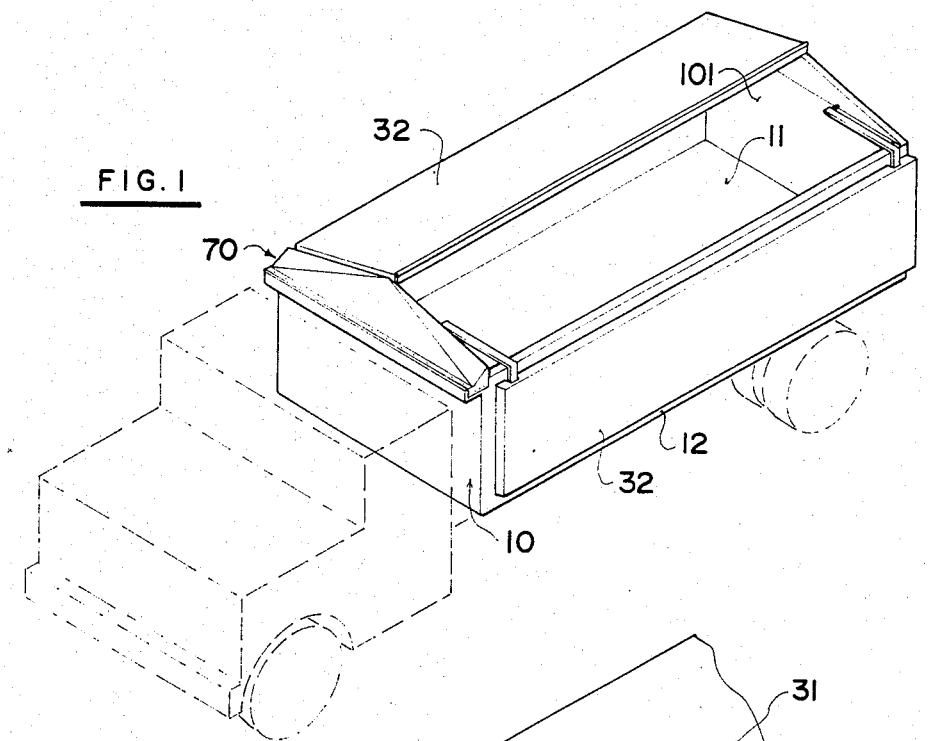
FIG. 1 is an isometric view of a container including a cover according to the invention.

A conventional truck box is illustrated in the drawings and comprises a floor 11 and upstanding side wall 12 both of which are seen in cross section. In addition, a front end face 10 and a rear end face 101 are provided leaving a generally open top. A gable end portion 30 is provided extending upwardly from the top of the side wall 12 to a ridge at the mid-line of the truck box indicated at 14.

Figure 2:
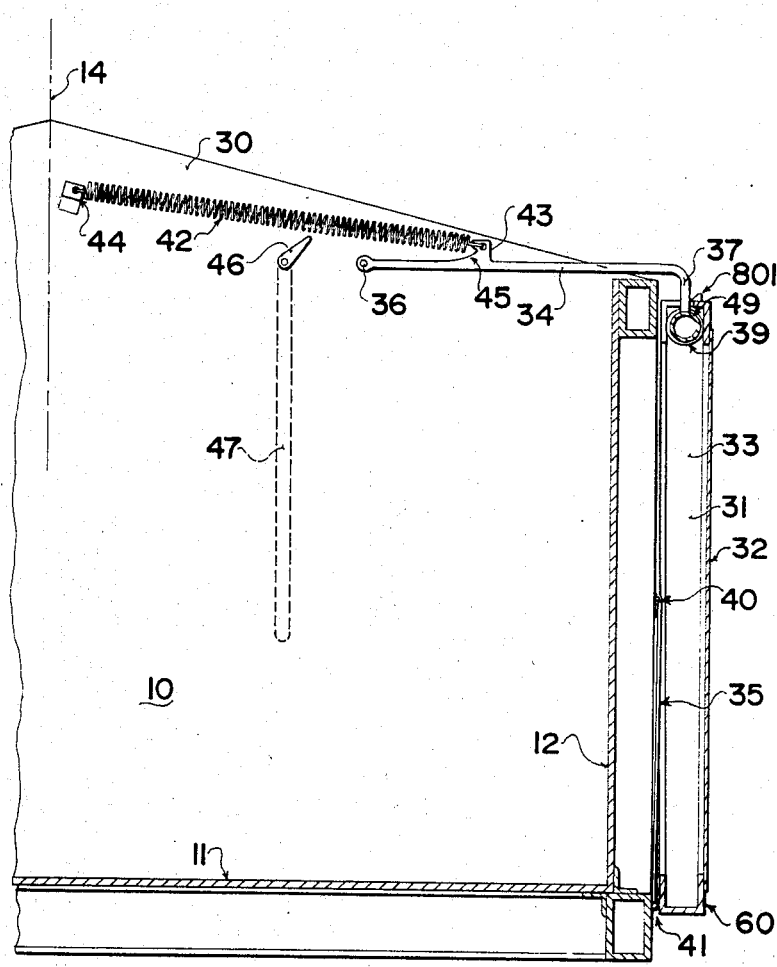
FIG. 2 is a transverse cross sectional view showing the cover arrangement of FIG. 1 in the open position.
Figure 3:
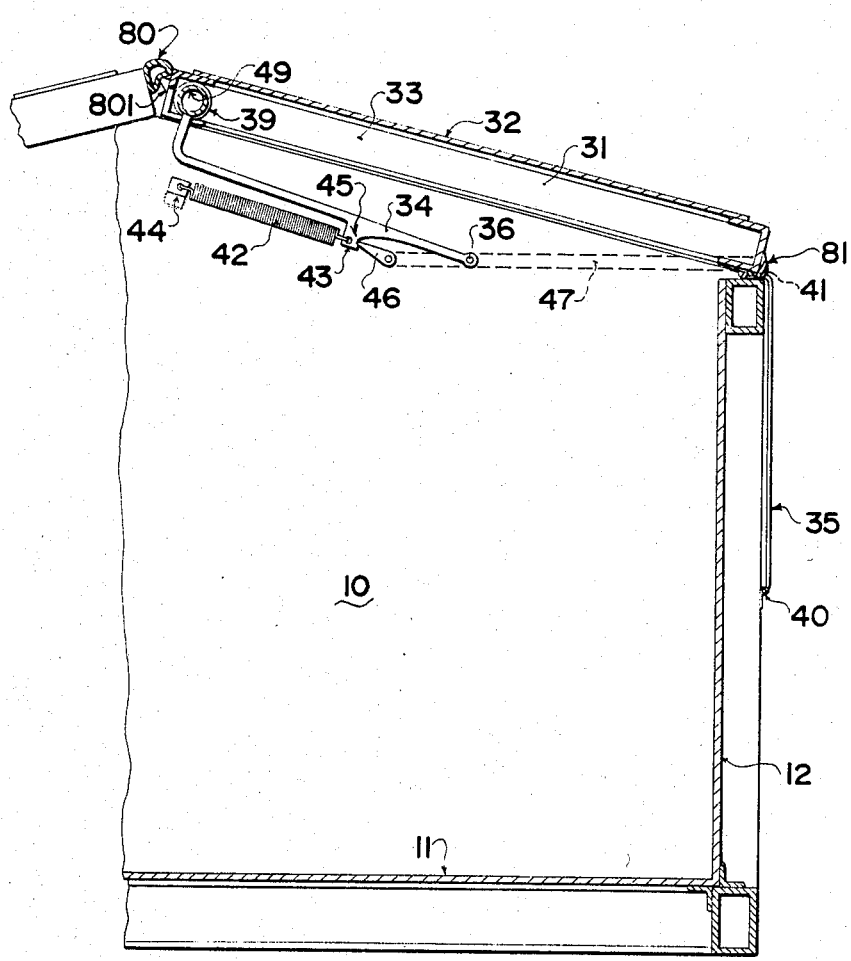
FIG. 3 is a cross sectional view similar to FIG. 2 showing the cover in the closed position.

A cover 31 is movable from an open position shown in FIG. 2 where it lies alongside the side wall 12 to a closed position shown in FIG. 3 where it lies on top of the gable end portion 30 so as to cover one half of the open top of the truck box.

It will be appreciated that a similar symmetrically opposite cover is provided on the other half of the truck box as shown in FIG. 1.

The cover 31 is formed of an aluminum sheet 32 covering a frame formed by side and end braces in the form of channel sections 60, 61 and intervening transverse cross braces or struts 50 parallel to the ends. The end braces 61 in the form of channel sections with the legs thereof directed inwardly, are arranged to overlie the gable end portion 30 with the other end brace overlying the gable end portion of the rear of the truck box.

Figure 4:
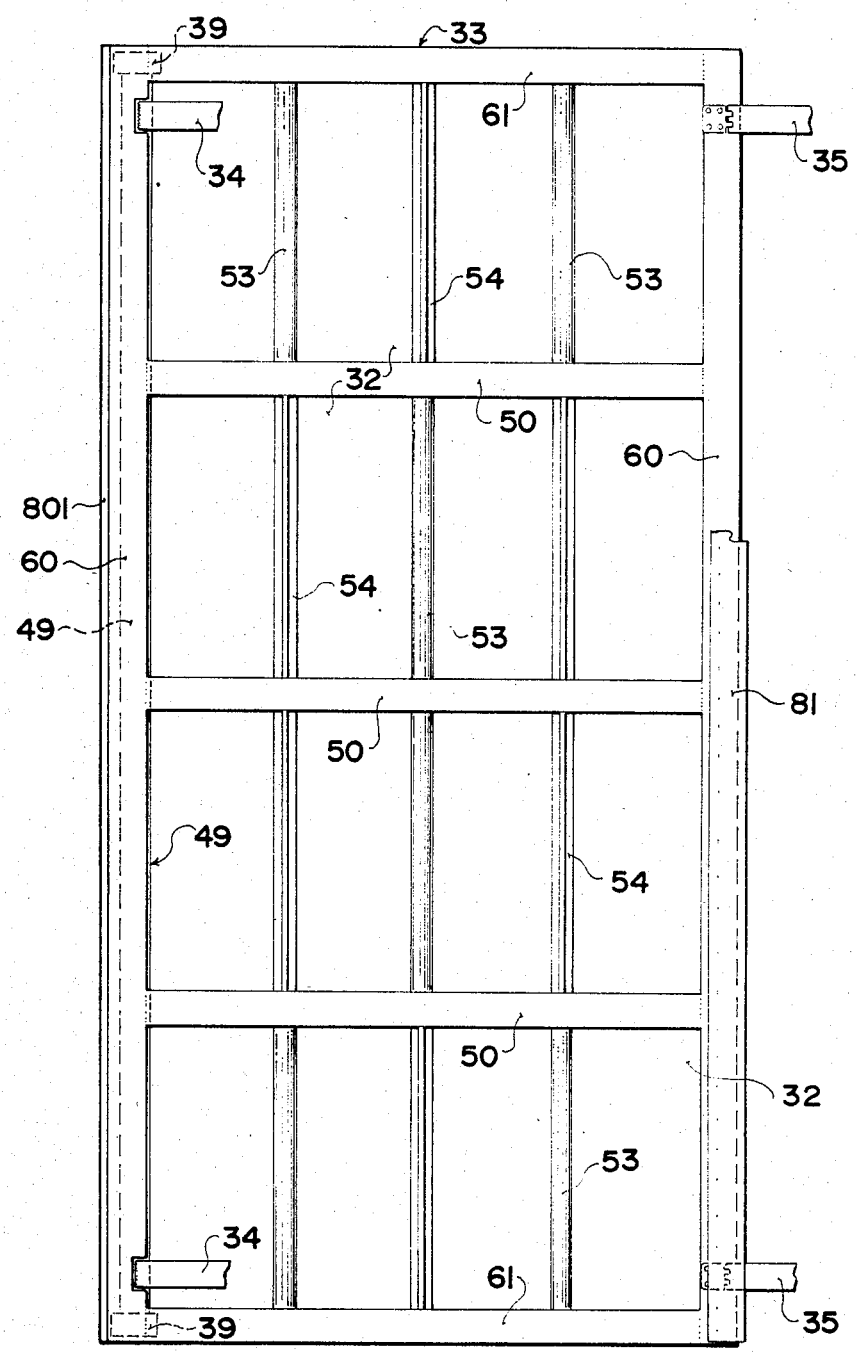
FIG. 4 is a view from the underside of one cover panel of FIG. 1.

The cover 31 is movable on a first lever or pivot arm 34 and on a second lever or pivot arm 35. The first lever 34 is pivotally mounted on the gable end section 30 mid-way between the side wall 12 and the mid line 14 on a pivot pin 36. The lever 34 includes a straight section extending to the side wall 12 and then a second section 37 at right angles to the first section so as to extend down the side wall 12 on the outside thereof to a torque tube 49 to which the section 37 is attached as by welding. The torque tube 49 as shown in FIG. 4, extends along the full length of the cover panel and is mounted at its ends in bearings 39 carried in the end braces 61.

The other lever 35 is mounted on simple flat hinges 40 and 41, one of which 40 is attached to the side 12 of the truck box on the outside thereof approximately at the mid height thereof with the hinge facing upwardly. The other of the hinges 41 is attached to the end of the end brace 33 on the edge thereof facing the outside wall 12 of the truck box with the hinge facing downwardly. The lever 35 comprises a simple strap extending between the hinges which lies flat to the outside of the truck box in both the open and closed positions and is hidden between the truck box wall 12 and the end brace 33 in the open position shown in FIG. 2.

A spring 42 is coupled between a bracket 43 on the lever 34 and a mounting bracket 44 on the gable end section 30. The spring is in relaxed condition in the closed position of the truck box shown in FIG. 3 and is in extended position in the open position shown in FIG. 2 so that it acts to bias the lever 34 into the closed position as the cover is moved towards the closed position. The bracket 43 on the lever 34 includes a notch 45 in its surface facing the pivot pin 36 for cooperation with a dog 46. In the closed position shown in FIG. 5, the dog 46 projects into the notch 45 so as to lock the lever 34 in the closed position of the cover. The dog 46 is attached to a manually operable lever 47 on the outside of the truck box, that is on the other side of the gable end section 30 with a pin coupling the dog to the lever and passing through the gable end section 30.

Figure 5:
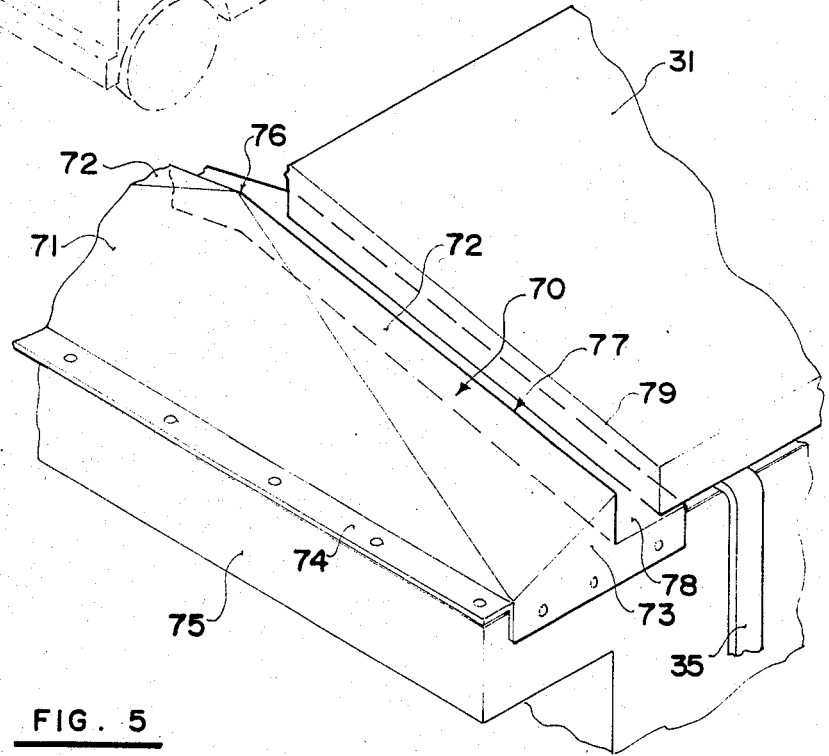
FIG. 5 is an isometric view on an enlarged scale showing a modified gable end arrangement.

In operation of the device, with the cover in the closed position shown in FIG. 5 and the lever 46 locking into the notch 45 to hold the cover in the closed position, the lever 47 is moved manually downwardly thus rotating the dog 46 about the pin 48 coupling the dog 46 and the lever 47 thus acting to rotate the lever 34 about the pin 36. This movement acts to lift the cover slightly from the gable end section 30. From this position the cover is free to be pivoted on the two levers 34, 35 around the corner between the gable end section 30 and the side wall 12 with the levers 34, 35 pivoting in a clockwise direction about the respective pivots 36, 49.

The torsion bar 49 communicates rotational movement of one pivot or lever 34 to the other at the opposite end so that the levers 34 move together regardless of the position along the length of the cover at which the pivotal force is applied.

From the position shown in FIG. 1, the cover can be closed simply by pulling the bottom end of the cover away from the side wall 12 thus acting to pivot the lever 35 in an anti clockwise direction. When the lower end has been lifted outwardly to a sufficient degree, the spring 42 commences to apply inward force to the upper end thus drawing it inwardly until the lever 34 engages the dog 46 whereupon the lever 34 can be locked into its closed position by manually raising the lever 47 from its lower position to the locked or latched position in which it lies horizontal as shown in FIG. 3.

The whole cover arrangement can be removed readily from the truck box simply by removing the pins from the hinges 40 adjacent the front and rear of the truck box and by unbolting the gable end structures to which the levers 34 are attached thereby removing the cover and gable ends as a unit.

In addition, the gable ends 30 are included as part of a cover arrangement so that these can be applied to or removed from a conventional truck box without difficulty on suitable bolted flanges.

FIG. 4 is an inverted plan view of the cover 31 of FIGS. 2 and 3 showing the framework including the end support channels 61 and the aluminum sheet material 32 forming the surface of the cover. The cover 31 is supported by the end struts 61 and by three or more intervening struts 50. In addition, a top side channel 60 lies along one side of the cover and a bottom side channel 60 lies along the other side. It will then be appreciated that the side rail 60 lies adjacent the edge of the truck box for cooperation with at least two of the hinges 41 arranged along the length of the truck box. The other side rail lies adjacent the middle of the truck box for abutment with a side 60 of the other half of the cover.

The sides 60 are formed from aluminum extrusions of channel section with the open side of the channel facing inwardly toward the other side. The struts 61 and 50 are similarly formed of aluminum extrusions of suitable shape and are connected suitably to the sides 60. The torque tube 49 lies inside or partly inside the channel section defined by the side 60, that is adjacent the ridge of the cover and is coupled to the end struts 61 by bearings 39 so that they can be moved conjointly by forces applied at one end.

In order to allow the use of light extrusions of aluminum particularly for the side 60 adjacent the ridge which is effectively unsupported from the ends 61, the struts 61 and 50 are interconnected by torque resistant weight transfer tubes 53 lying along the length of the cover between two adjacent such struts. More particularly, there are provided more such supporting tubes 53 adjacent the ends than in the middle sections to support the weight of the cover and applied to the front and rear edges of the truck box and the side edge contacted by the side 52 of the cover.

In a longer cover for use with a full size truck box of the order of 40 feet in length, the struts 50 may be spaced by four foot lengths with a greater number of support tubes 53 in the end sections than at the middle with as many as three or four support tubes 53 in the end sections. In this way, the weight of the cover is kept to a minimum while providing a self-supporting cover which avoids sagging of the side 51 which is effectively unsupported apart from its ends.

In one arrangement, the tubes 53 can be torqued in manufacture so as to oppose sagging of the cover. Thus, the cover can be manufactured in a jig which sets up bowing of the cover in a direction to oppose the sagging, with the tubes 53 normally torqued with the cover straight.

To support the skin 42 a plurality of T-bars 34 is provided in between the tubes 53 with the flat of the T abutting against the skin.

Each of the gable ends can comprise a simple triangular member upstanding from the front and rear panels of the truck box and lying in substantially the same vertical plane as the respective panel. The gable end can include a flange at the bottom for attachment by suitable screws to the upper face of the front or rear end and a flange at the upper edge for supporting the edge of the covers.

In FIGS. 1 and 5 is shown a modified gable end structure for use at the front and rear of the truck box. In this arrangement, instead of the gable end remaining in the plane of the front or rear panel, the gable end is inclined inwardly so as to partly cover an end portion of the open top of the truck box. Thus, the gable end generally indicated at 70 in FIG. 5 is formed from flat sheet metal which is formed by bending to provide a front triangular portion 71, two major side triangular portions 72 and a minor side triangular portion 73 at each end of the gable end, only one of which is shown in FIG. 5.

The triangular portion 71 extends from one side of the end to the other side with a flange 74 along the longest side of the triangle for attachment to the top box section 75 of the front or rear end of the truck box. The triangular portion 71 from the flange 74 is inclined rearwardly to an apex 76 which is typically positioned 10 inches (25 cm) above the flange 74 and approximately 12 inches (30 cm) rearwardly of the flange 74.

The side triangles 72 and 73 connect the apex 76 to the side of the truck box. The triangle 72 provides an inner edge 77 which inclines upwardly to the apex but lies in a vertical plane parallel to the flange 74 and spaced from the flange by the same distance as the apex 76. The edge 77 therefore lies parallel to the edge of the cover 31.

At the edge 77, the gable end is folded down wardly and then outwardly parallel to the triangular portion 72 to form a flange 78 on which the edge of the panel 31 can sit. In order to accommodate the thickness of the panel 31, the triangular portion 73 lifts the bottom edge of the triangle 72 at the apex adjacent the panel 31 so that the edge 77 lies slightly above or at the same height as the upper front edge indicated at 79 of the cover panel 31. In order to provide a seal which can prevent the entry of moisture or of wind, the flange 78 can be covered with a rubber layer on which the cover panel 31 sits.

The gable end therefore acts as a deflector for air at the front of the truck box and lifts it over the cover panels so as to prevent air being injected into the space between the gable end and the cover panel. This air movement can also develop a suction which acts to keep moisture away from the space between the cover panel and the gable end and to assist in the operation of the seal provided by the rubber cover.

Turning again to FIG. 3, in order to provide a seal between the two cover panels 31 when in the closed position, a rubber bead 80 can be attached to the edge face of one of the panels for abutting the other panel in the closed position and providing a seal. Normally, this rubber strip will provide sufficient sealing capacity to prevent the entry of moisture, but in case the rubber strip should become damaged, a water channel 81 can be provided along the underside of the other or opposite panel to communicate any moisture passing between the cover panels to one end of the cover for ejection down across the flange 78.

In order to accommodate twisting movements of the truck box, the edges of the cover panels are spaced from the edges of the gable ends by a distance which can be conveniently of the order of one inch (2.5 cm). The flange 78 is accordingly increased in width to ensure that the cover panel is properly supported.

The above description shows the cover arrangement in conjunction with a truck box for which it is particularly suitable, but it will be apparent that it could in fact be used for other containers which require covers, for example, large rectangular stationary garbage containers.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A cover arrangement for a container having a vertical side panel and an open top, the cover arrangement comprising a substantially rigid cover panel, means for mounting the cover panel on the container for pivotal movement from a first position in which the cover panel lies over the open top to a second position in whic the cover panel hangs downwardly alongside and parallel to the vertical side panel, said mounting means including a pair of pivotal members each having one end attached to said container for pivotal movement relative thereto and arranged relative to the cover panel at positions spaced longitudinally thereof, an elongate torque transmission member interconnecting said pivotal members at respective ends thereof remote from said one end for common pivotal movement of said pivotal members and torque transmission member relative to said container, means mounting said cover panel on said pivotal members and said torque transmission member for pivotal movement relative thereto such that said torque transmission member is arranged at one edge thereof and rigid coupling means for interconnecting said cover panel and said vertical side panel whereby said pivotal movement of said pivotal members and torque transmission member causes said cover panel to move from said first position to said second position.

2. The invention according to claim 1 wherein the torque transmission member comprises a torque tube.

3. The invention according to claim 1 including bearing means mounting said torque transmission member for rotation relative to said cover panel, said pivotal members being rigidly attached to said torque transmission member.

4. The invention according to claim 1 wherein the cover panel is elongate with the pivotal members arranged adjacent a front and rear end respectively of the cover panel, the torque transmission member extending along substantially the full length of the panel.

5. The invention according to claim 1 wherein the container has two spaced parallel vertical side panels and wherein the cover arrangement comprises a pair of substantially rigid cover panels and means for mounting each of the cover panels on the truck box for pivotal movement from a first position in which the cover panels lie side by side with one edge in abutting relationship with the other panel over the open top and an opposed edge at a top edge of a respective side panel to a second position in which each of the cover panels hangs downwardly alongside and parallel to the respective side panel, each of said cover panels including a torque transmission member extending along the length thereof adjacent said one edge.

6. The invention according to claim 5 wherein the container includes front and rear spaced parallel vertical panels and wherein the arrangement includes a pair of gable ends for attachment to a respective one of the front and rear panels, each gable end converging to an apex at a position midway across the respective panel whereby said cover panels rest on said gable ends with said one edge thereof at the apex and wherein said one end of each of said pivotal members is connected to a respective one of said gable ends.

7. The invention according to claim 6 wherein said gable end is shaped such that said apex is spaced inwardly relative to a plane containing a respective one of said front and rear panels toward the opposite one thereof whereby the cover panels are shorter in length than the truck box.

8. The invention according to claim 1 wherein said mounting means comprises a pair of lever arrangements at longitudinally spaced positions of the cover panel, each lever arrangement including a pair of levers spaced transversely of said cover panel, one of said levers comprising said pivotal member.

9. A cover arrangement for a container having a vertical side panel and an open top, the cover arrangement comprising a substantially rigid cover panel, means for mounting the cover panel on the container for pivotal movement from a first position in which the cover panel lies over the open top to a second position in which the cover panel hangs downwardly alongside and parallel to the vertical side panel, said cover panel having a length greater than the width thereof and comprising a flat sheet and a framework supporting the flat sheet, the framework including a plurality of transversely extending support struts, at least one strut being rigidly connected to the next adjacent strut by at least one longitudinally extending torque resistant tube.

10. The invention according to claim 9 including outer frame members arranged longitudinally of the flat sheet at the edges thereof, the tubes being arranged intermediate said outer frame members.

11. The invention according to claim 9 wherein said cover arrangement includes means for supporting one longitudinal edge of said cover panel only at spaced positions along the length thereof, said spaced positions occurring at respective ones of the struts.

12. The invention according to claim 11 wherein there are provided more such tubes between a supported strut and the next adjacent strut than between struts intermediate the supported struts.

13. A cover arrangement for a container having two spaced parallel vertical side panels and an open top, the cover arrangement comprising a pair of substantially rigid cover panels, and means for mounting each of the cover panels on the container for pivotal movement from a first position in which the cover panels lie side by side with one edge in abutting relationship with the other panel over the open top with an opposed edge at a top edge of a respective side panel to a second position in which each cover panel hangs downwardly alongside and parallel to the respective vertical side panel, said mounting means comprising for each cover panel two longitudinally spaced pairs of levers. each pair having an upper lever with one end pivotally connected adjacent said one edge of the panel and the other end for pivotal connection to said container between said respective side panel and a centre line of the container and a lower lever with one end pivotally connected adjacent said opposed edge of the cover panel and the other end for pivotal connection to said container on an outer surface of said respective side panel.

14. The invention according to claim 13 wherein the length of each lever is substantially equal to half the width of the cover panel and wherein each lever is arranged for mounting of the other end thereof on the container at a position which is spaced from the top edge of the side panel by the length of the lever.

15. The invention according to claim 13 wherein the top lever has an end portion adjacent said cover panel canted outwardly at an angle to the main body thereof whereby in the second position the end portion extends downwardly along the side panel such that the edge of the cover panel in the second position is at or below the top edge of the side panel.

16. The invention according to claim 13 including spring means biasing said levers into said first position.

17. The invention according to claim 13 including latch means for latching said cover panels in said first position.

18. The invention according to claim 17 wherein each of said latch means comprises a rotatable dog attached to an actuating lever for manual operation, one of the upper levers including a latch portion against which said dog engages when rotated into a latched position and being arranged such that rotation of the dog in the opposite direction acts to lift the lever away from the first position.

19. A cover arrangement for a container having two opposed parallel spaced vertical side panels, two opposed parallel spaced vertical end panels and an open top, the cover arrangement comprising a pair of gable end members each for mounting on a respective one of the end panels and cover means for overlying said gable end members and spanning the space therebetween to cover said open top, each of said gable end members being generally triangular in end elevation to define an apex at a position centrally of said end panel and defining a support surface for receiving and supporting an edge of the cover means, at least one said gable end members being shaped such that said apex is spaced inwardly of a plane containing the respective end panel and so as to define a triangular outer surface which is inclined from a base edge thereof at a top edge of said end panel inwardly to said apex.

* * * * *